United States Patent [19]

Tremeau

[11] 4,209,005
[45] Jun. 24, 1980

[54] APPARATUS FOR CUTTING SILICON HAVING A PIVOTED WORK CARRIAGE UTILIZING AN AIR BEARING

[75] Inventor: Claude Tremeau, Saint-Peray, France

[73] Assignee: Crouzet, Paris, France

[21] Appl. No.: 970,144

[22] Filed: Dec. 18, 1978

[30] Foreign Application Priority Data

Dec. 22, 1977 [FR] France ................................ 77 38932

[51] Int. Cl.² ............................................. B24B 27/06
[52] U.S. Cl. ...................................125/13 R; 51/73 R; 83/411 R; 83/703
[58] Field of Search ................... 125/13 R, 15; 51/73; 83/411 A, 703

[56] References Cited

U.S. PATENT DOCUMENTS

4,063,482  12/1977  Pizzey et al. ...................... 83/411 A

FOREIGN PATENT DOCUMENTS

1319768  6/1973  United Kingdom ................... 51/73 R

*Primary Examiner*—J. M. Meister
*Attorney, Agent, or Firm*—Holman & Stern

[57] ABSTRACT

The machine tool of the invention comprises a frame (100) with an upper plate (1), an annular saw blade (3) of which the cutting part is made on its inner periphery and which is supported by a rotatable mandrel (23), and a bar-holder carriage (2) pivotable above the upper plate (1) of the frame (100). The bar-holder carriage (2) is in abutment on an air cushion formed between the lower face of the bar-holder carriage (2) and the upper face of the plate (1) of the frame (100).

4 Claims, 2 Drawing Figures

APPARATUS FOR CUTTING SILICON HAVING A PIVOTED WORK CARRIAGE UTILIZING AN AIR BEARING

BACKGROUND OF THE INVENTION

The present invention relates to a machine tool for cutting bars, preferably made of silicon, into preferably very fine portions.

French Pat. No. 2,066,707 discloses a machine tool for cutting bars into portions, comprising a frame provided with an upper plate, a support column in the frame, a mandrel mounted to rotate in the support column, an annular saw blade of which the cutting part is made on its inner periphery and which is supported by the mandrel, a motor for rotating the mandrel and the saw blade, a bar-holder carriage arranged to pivot above the upper plate of the frame and about a spindle fixed to the frame and parallel to the axis of rotation of the mandrel and of the saw, and means on the bar-holder carriage for receiving a bar, for placing it into position of cut along the axis of the saw blade after having pivoted the bar-holder carriage and for lowering it step by step beyond the plane of cut of the saw blade.

In the machine tool of French Pat. No. 2,066,707, the mandrel supporting the cutting blade is mounted to rotate in the support column via a compressed air bearing. Although such an arrangement is advantageous for large diameter mandrels driven at a high speed, due to the small axial and radial clearance which may thus be preserved, such a machine tool is nevertheless not adapted to cutting bars, for example silicon bars, of large diameter and of heavy weight, which are more and more frequent at the present time, in view of the progress made in the processes for obtaining monocrystals.

SUMMARY OF THE INVENTION

It is therefore an object of the present invention to improve such a machine tool, but applying the technique of the air cushion to another part of the machine.

To this end, the machine tool of the invention, of the type mentioned hereinabove, is characterized in that the bar-holder carriage is in abutment on an air cushion formed between the lower face of the bar-holder carriage and the upper face of the plate of the frame.

Due to the invention, it is particularly easy to pivot the bar-holder carriage by hand, thus eliminating the stress due to the considerable weight of the bars.

In a preferred embodiment of the machine tool of the invention, the air cushion formed between the bar-holder carriage and the upper plate of the frame, is created by a source of compressed air and an electro-valve supplying two conduits pierced with orifices, opening out respectively on the lower surface of the bar-holder carriage and on the upper surface of the plate of the frame.

The invention will be more readily understood on reading the following description with reference to the accompanying drawings.

DETAILED DESCRIPTION OF THE PREFERRED EMBODIMENT

Figure 1:
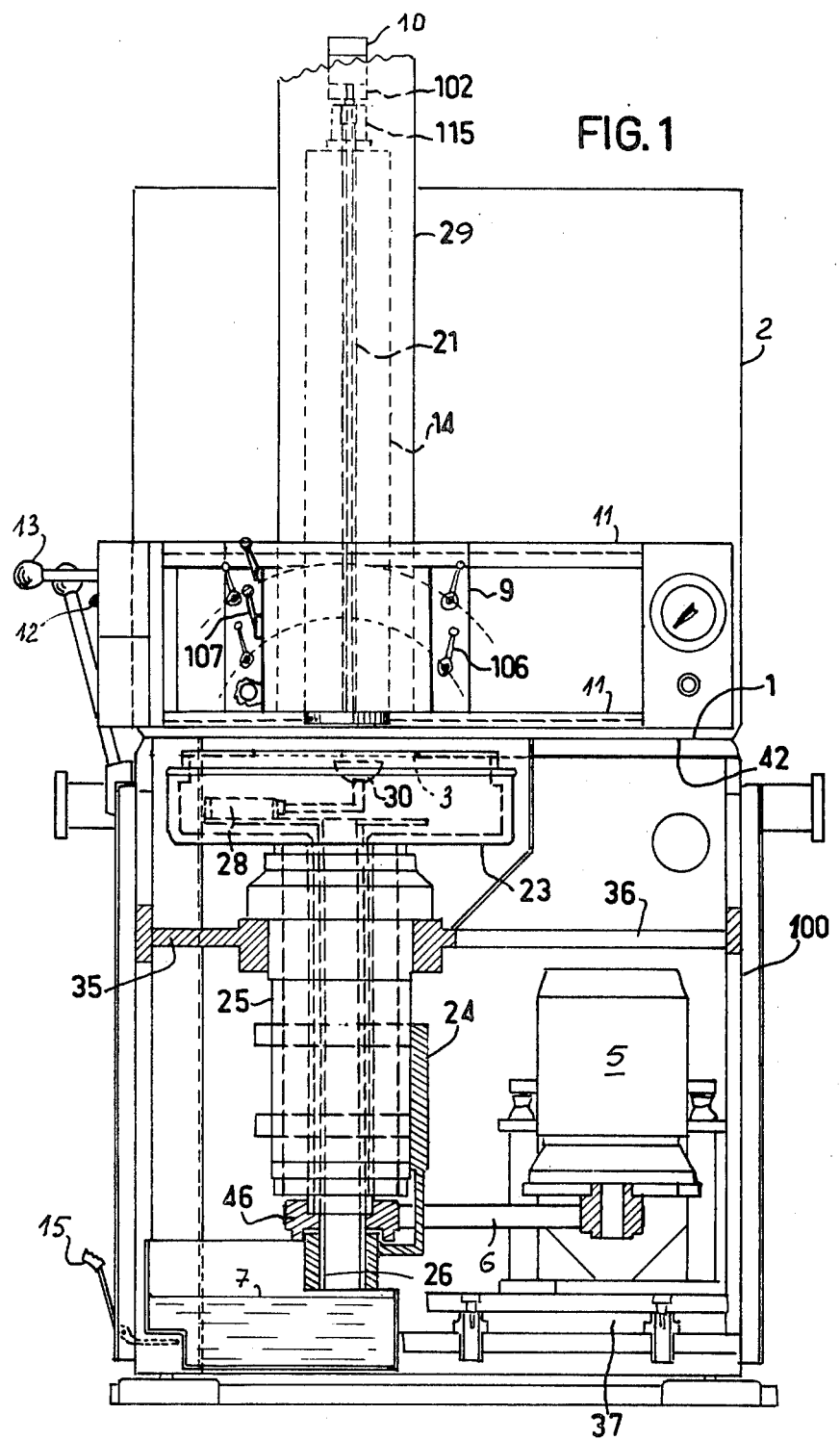
FIG. 1 shows a schematic vertical view of the machine tool of the invention.
Figure 2:
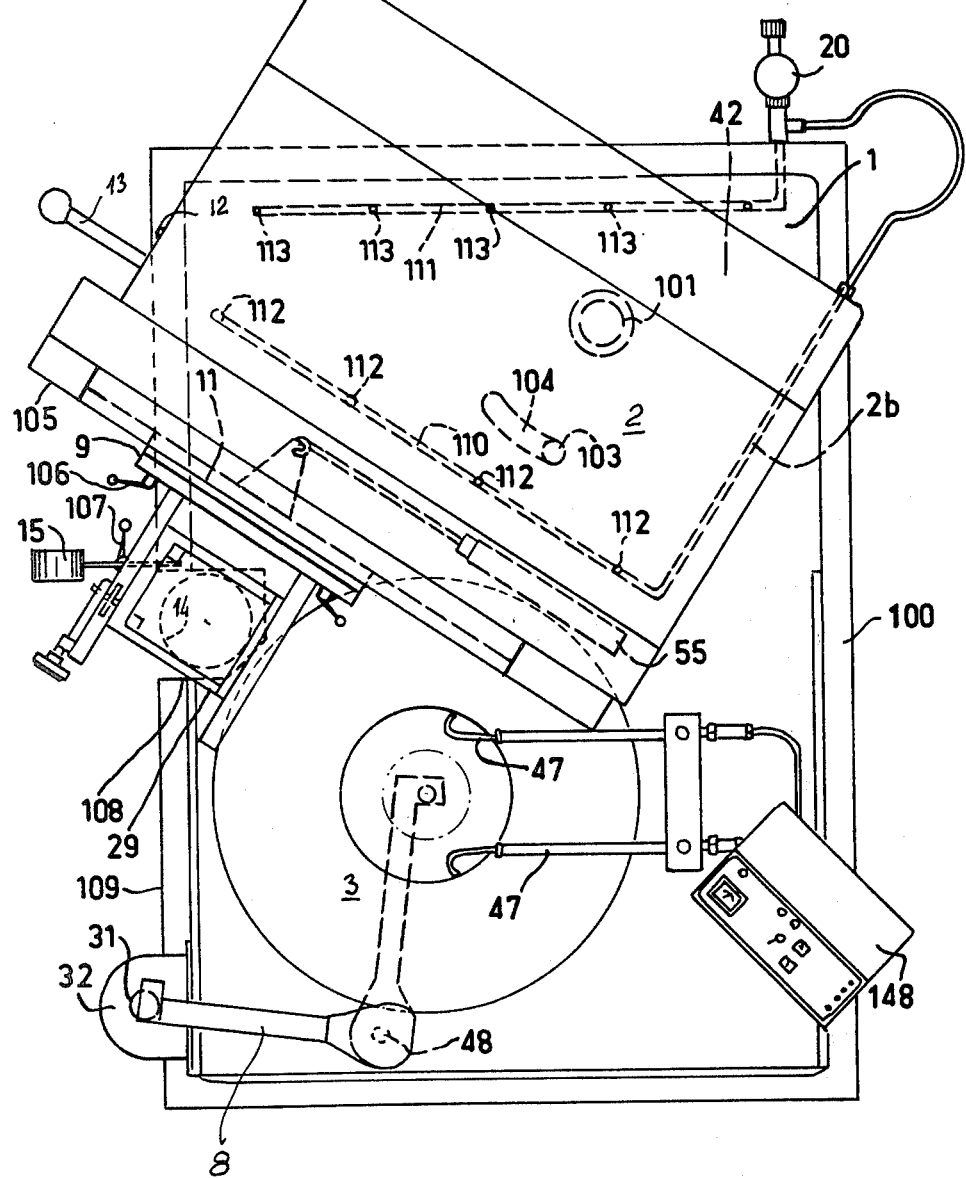
FIG. 2 shows a schematic plan view of the machine of FIG. 1.

Referring now to the drawings, the machine tool, shown in FIGS. 1 and 2, comprises a frame 100, provided with an upper plate 1, a support column 25, fixed to the frame 100 by two arms 35 and 36, a mandrel 23 mounted to rotate in the column 25, an annular saw blade 3 supported by the mandrel 23 in its upper part, a motor 5, fixed to the frame 100 by conventional means 37, for rotating the mandrel 23 and the blade 3 via a belt 6 and a drive wheel 46 fast with the mandrel 23, and a bar-holder carriage 2, provided with a lower face 42.

The annular saw blade 3 is maintained in the mandrel 23 by its outer periphery and the cutting part is made on its inner periphery, the corresponding surface of the blade being impregnated with diamond.

The frame 100 also comprises cooling means, known per se, constituted by a tank 7 of coolant fluid and pipes 47 for spraying fluid in the plane of cut of the blade 3, as well as a control desk 48.

Means for recovering the cut off portions of bar are also provided. They are constituted by a jack 28 and a suction disc 30, disposed beneath the plane of cut of the blade 3 and supported by a tube 26 mounted in the support column 25 and fixed to this column by a flanged vertical standard 24 and by an arm 8 and a suction disc 31 disposed at the end of the arm 8, the arm 8 being mounted to pivot about a pin 48 fixed perpendicularly to the plate 1 of the frame 100. The suction discs 30 and 31 are supplied with a source of vacuum (not shown).

The bar-holder carriage 2 is mounted above the plate 1 of the frame 100, on a pin 101 fixed perpendicularly to the plate 1. It may be pivoted manually about the pin 101 via a handle 13 fixed to the carriage. A stop 103, fixed on the plate 1, is provided to slide in a groove 104 made on the lower surface of the carriage 2, in order to limit pivoting thereof.

The carriage 2 possesses, on its vertical wall 105 oriented towards the saw blade 3, guides 11 in which is mounted a bar-holder 9 sliding under the action of a jack 55. In the bar-holder 9 is mounted a sleeve 29 adapted to receive a bar 14.

The sleeve 29 carries a motor 10 in its upper part, and an endless screw 21, rotated by the motor 10. A spindle 102, for gripping a bar, is mounted to slide vertically on the endless screw 21 in the sleeve 29. The sleeve 29 is arranged to pivot through a relatively small angle, about 10°, on either side of the vertical, in a first vertical plane parallel to the wall 105 of the carriage 2, by means of levers 106, and in a second vertical plane perpendicular to the first, by means of levers 107.

A vertical groove 108 is made in the vertical wall 109 of the frame to receive a bar, in the lower part of which is provided a support pedal 15 on which the bar may abut.

Finally, a source of air under pressure (not shown) is provided, in the circuit of which is mounted an electro-valve 20 controlled by a button 12 and fixed to the frame 100, supplying two conduits 110 and 111. The conduit 110 is made in the bar-holder carriage 2 and is provided with orifices 112 opening out on the lower surface 42 of the carriage 2. The conduit 111 is made in the frame 100 and is provided with orifices 113 opening out on the upper surface of the plate 1 of the frame 100. Thus, an air cushion may be created between the upper plate 1 of the frame 100 and the bar-holder carriage 2, by the passage of air in conduits 110 and 111.

The operation of the machine tool according to the invention will now be described.

A bar 14, for example made of silicon, is placed vertically on the pedal 15 in the groove 108 of the frame 100 (FIG. 2). The air source and the electrovalve 20 having been switched on, the carriage 2 is pivoted manually in one direction, with the aid of handle 13, into the position of FIG. 2, so as to dispose the sleeve 29 vertically with respect to the bar 14. The motor 10 also having been switched on, the spindle 102 descends along the endless screw 21 and, after having slightly raised the bar 14 with the aid of the pedal 15, grips the upper end of the bar 14, provided, to this end, with a square 115 arranged to be engaged by the spindle 102. The bar 14 is then raised in the sleeve 29 by means of the motor 10, via the spindle 102 and the screw 21. The carriage 2 is again pivoted manually in the other direction, to dispose the axis of the bar 14 in the axis of the mandrel 23 and the saw 3. The exact alignment of the two axes, of the bar and of the saw, is obtained by orienting the sleeve 29 in the two vertical planes previously defined, with the aid of levers 106 and 107. The motor 10 then causes the bar 14 to descend by a length equal to the thickness of the portion to be cut off, inside the inner cutting periphery of the saw 3. The suction disc 30, which is mounted with clearance along the cutting direction, is prepositioned by jack 28. Then, the saw 3 being rotated by means of the motor 5, via the belt 6, the wheel 46 and the mandrel 23, the jack 55 is actuated, provoking the advance of cut, driving the bar-holder 9, and therefore the sleeve 29, in horizontal translation on the guides 11, and therefore the bar 14 against the saw 3. The suction disc 30 is then applied against the lower end of the bar 14, by switching on the vacuum source, and follows, because of its longitudinal clearance, the advance of the bar until the end of the cut. At the end of cut, the bar 14 is raised in the sleeve 29, and the jack 28 replaces the portion of bar cut and fixed to the suction disc 30 at the centre of the saw blade 3. The supply of the suction disc 30 is then cut, and the arm 8 is pivoted so that its suction disc 31, supplied by the source of vacuum, is applied on the cut-off portion. Finally, the arm 8 is again pivoted towards a basket 32, fixed to the frame 100, into which the cut off portion falls, after the supply of the suction disc 31 has been cut.

The cutting operation may then recommence and be continued step by step.

The handling of the bar, from its position of loading in the groove 108 of the frame 100 to its position of cut, is therefore facilitated by the air cushion created between the carriage 2 and the frame 100.

What is claimed is:

1. A machine tool for cutting bars into portions, comprising a frame provided with an upper plate, a support column in the frame, a mandrel mounted to rotate in the support column, an annular saw blade of which the cutting part is made on its inner periphery and which is supported by the mandrel, a motor for rotating the mandrel and the saw blade, a bar-holder carriage arranged to pivot above the upper plate of the frame and about a spindle fixed to the frame and parallel to the axis of rotation of the mandrel and of the saw, and means on the bar-holder carriage for receiving a bar, placing it into position of cut along the axis of the saw blade after having pivoted the bar-holder carriage and for lowering it step by step beyond the plane of cut of the saw blade, characterized in that the bar-holder carriage is in abutment on an air cushion formed between the lower face of the bar-holder carriage and the upper face of the plate of the frame.

2. The machine tool according to claim 1, wherein the air cushion formed between the bar-holder carriage and the upper plate of the frame is created by a source of compressed air and an electrovalve supplying two conduits pierced with orifices opening out respectively on the lower surface of the bar-holder carriage and on the upper surface of the plate of the frame.

3. The machine tool, according to claim 1, wherein the frame comprises a vertical groove at the base of which is provided a support pedal for receiving a bar to be cut.

4. The machine tool according to claim 1, wherein said means on the bar-holder carriage comprise a bar holder mounted to slide horizontally in guides, a sleeve maintained in the bar-holder, means for raising and descending a bar in the sleeve step by step, and means for pivoting the sleeve slightly about the vertical, in a first plane parallel to that of the guides and in a second plane perpendicular to the first.

* * * * *